US012785830B2

(12) United States Patent
Taniguchi et al.

(10) Patent No.: US 12,785,830 B2
(45) Date of Patent: Nov. 3, 2026

(54) PROPAGATION ENVIRONMENT ESTIMATION METHOD, PROPAGATION ENVIRONMENT ESTIMATION SYSTEM AND PROPAGATION ENVIRONMENT ESTIMATION DEVICE

(71) Applicant: NTT, Inc., Tokyo (JP)

(72) Inventors: Ryotaro Taniguchi, Musashino (JP); Tomoki Murakami, Musashino (JP); Tomoaki Ogawa, Musashino (JP); Yasushi Takatori, Musashino (JP); Minoru Inomata, Musashino (JP)

(73) Assignee: NTT, Inc., Tokyo (JP)

( * ) Notice: Subject to any disclaimer, the term of this patent is extended or adjusted under 35 U.S.C. 154(b) by 170 days.

(21) Appl. No.: 18/723,485

(22) PCT Filed: Dec. 24, 2021

(86) PCT No.: PCT/JP2021/048384

§ 371 (c)(1),
(2) Date: Jun. 24, 2024

(87) PCT Pub. No.: WO2023/119662

PCT Pub. Date: Jun. 29, 2023

(65) Prior Publication Data

US 2025/0062844 A1 Feb. 20, 2025

(51) Int. Cl.
*H04B 17/391* (2015.01)
*G01J 1/42* (2006.01)
*G01J 1/44* (2006.01)

(52) U.S. Cl.
CPC .......... *H04B 17/391* (2015.01); *G01J 1/4257* (2013.01); *G01J 1/44* (2013.01)

(58) Field of Classification Search
CPC ........ H04B 17/391; G01J 1/4257; G01J 1/44; H04W 16/18
See application file for complete search history.

(56) References Cited

U.S. PATENT DOCUMENTS

2004/0259554 A1* 12/2004 Rappaport ............ H04W 16/18 455/446
2020/0158855 A1* 5/2020 Blanche .............. G01S 13/9011

OTHER PUBLICATIONS

Famoriji, O., Shongwe, T., Source Localization of EM Waves in the Near-Field of Spherical Antenna Array in the Presence of Unknown Mutual Coupling, Wireless Communications and Mobile Computing, 2021, 3237219, 14 pages, 2021. https://doi.org/10.1155/2021/3237219 (Year: 2021).*

(Continued)

*Primary Examiner* — Michelle M Iacoletti
*Assistant Examiner* — Alexandria Mendoza
(74) *Attorney, Agent, or Firm* — XSENSUS LLP

(57) ABSTRACT

Estimating a propagation environment of a radio wave using a scale model. The method includes the following steps. The scale model is created. In the scale model, a light source capable of emitting directional light and scanning an irradiation direction is installed, regarding the light source as a transmission station of a radio wave. The light source scans an inside of the scale model, and a center light generation state in which center light directed to a measurement point set in the scale model is generated is detected in a process of scanning. A light receiving sphere is installed such that a center coincides with the measurement point. A direction connecting a position of an irradiated point appearing on the light receiving sphere and a position of the center under the center light generation state is estimated as an arrival direction of the light reaching the measurement point.

20 Claims, 10 Drawing Sheets

(56) References Cited

OTHER PUBLICATIONS

T. Huschka, "Ray tracing models for indoor environments and their computational complexity," 5th IEEE International Symposium on Personal, Indoor and Mobile Radio Communications, Wireless Networks, The Hague, Netherlands, 1994, pp. 486-490 vol. 2, doi: 10.1109/WNCMF.1994.52 (Year: 1994).*
Shinichi Ichitsubo, "Establishment of scale model method for radio wave propagation", Form C-19, Scientific Research Grant Program (Scientific Research Grant), Research Result Report, May 18, 2012, 10 pages including English Translation.

* cited by examiner

PROPAGATION ENVIRONMENT ESTIMATION METHOD, PROPAGATION ENVIRONMENT ESTIMATION SYSTEM AND PROPAGATION ENVIRONMENT ESTIMATION DEVICE

CROSS-REFERENCE TO RELATED APPLICATION

The present application is based on PCT filing PCT/JP2021/048384, filed Dec. 24, 2021, the entire contents of which is incorporated herein by reference.

TECHNICAL FIELD

The present disclosure relates to a propagation environment estimation method, a propagation environment estimation system, and a propagation environment estimation device, and more particularly, to a propagation environment estimation method, a propagation environment estimation device, and a propagation environment estimation system suitable for environment estimation of a wireless signal using a scale model.

BACKGROUND ART

In recent years, with an explosive spread of wireless communication devices, demand for wireless communication has increased. Meanwhile, frequency resources that can be used for wireless communication are limited. Therefore, it is necessary to use a frequency that has not been used so far in addition to existing frequencies. In using a new frequency band, it is necessary to investigate in advance a propagation characteristic of a wireless signal in a service area, an influence of interference of a signal of the new frequency band on another system, and the like.

Under such demands, for example, in the radio communication sector (ITU-R) of International Telecommunication Union (ITU), attempts have been made to actually measure propagation characteristics of radio signals in a real area and formulate a propagation model from various measurement results. However, in this type of attempt, there are problems that a measurement result for an undeveloped frequency is not sufficient, a propagation model is not sufficiently formulated, and the like.

Non Patent Literature 1 below discloses a method for reproducing characteristics of a propagation loss in a mobile communication environment using a scale model. FIG. 1 is a schematic diagram illustrating a state in which a propagation model is estimated by actual measurement in a real area and a state in which model estimation by actual measurement is performed using a scale model in comparison.

As illustrated in FIG. 1, in the method using the scale model, for example, the scale model is produced for a real city area or the like at a scale of 1/100 or the like. Then, a radio signal is generated under the environment of the scale model, and propagation characteristics of radio waves of the wireless signal is measured. According to such a method, cost required for collecting necessary data can be substantially reduced as compared with a case where the propagation environment is actually measured in a real city area.

CITATION LIST

Non Patent Literature

Non Patent Literature 1: "Establishment of scale model method for radio wave propagation", Shinichi ICHITSUBO, Scientific Research Grant Program (Scientific Research Grant), Research Result Report, May 18, 2012

SUMMARY OF INVENTION

Technical Problem

In a space where various buildings are mixed such as a city area, radio waves emitted from a transmission station are repeatedly reflected, and thus arrival directions of the radio waves at each point in the area are various. Therefore, in starting a new communication service, it is important to estimate from which direction the radio waves arrive at each point in a target area.

As described above, in the conventional method using the scale model, the propagation environment is estimated by actually measuring behavior of radio waves under the environment of the scale model. In the measurement using radio waves, for example, the arrival direction can be estimated by arranging a plurality of antennas at a measurement point and analyzing a phase difference of the radio waves reaching the antennas. Alternatively, the arrival direction can also be estimated by arranging an antenna having sharp directivity at a measurement point and performing omnidirectional scanning with the antenna.

However, if a plurality of antennas is installed for each measurement point in the scale model, the cost and labor required for installing the antennas become large. In addition, since the antenna having sharp directivity is generally large, it is difficult to fit in the scale model. For this reason, the method of estimating the propagation environment of the radio waves using the scale model has a problem of estimating the arrival direction of the radio waves simply and at low cost.

The present disclosure has been made in view of the above problem, and a first object of the present disclosure is to provide a propagation environment estimation method for estimating an arrival direction of a radio wave at an arbitrary measurement point simply and at low cost when estimating a propagation characteristic of a radio wave using a scale model.

Further, a second object of the present disclosure is to provide a propagation environment estimation system that estimates an arrival direction of a radio wave at an arbitrary measurement point simply and at low cost when estimating a propagation characteristic of a radio wave using a scale model.

Moreover, a third object of the present disclosure is to provide a propagation environment estimation device that estimates an arrival direction of a radio wave at an arbitrary measurement point simply and at low cost when estimating a propagation characteristic of a radio wave using a scale model.

Solution to Problem

To achieve the above-described objects, the first aspect is a propagation environment estimation method for estimating a propagation environment of a radio wave using a scale model, and desirably includes:

- a model creation step of creating a scale model;
- a light source installation step of installing a light source in the scale model, regarding the light source as a transmission station of a radio wave, the light source being capable of emitting light having directivity and scanning an irradiation direction;

a scanning step of scanning an inside of the scale model with the light source;

a center light search step of detecting a center light generation state in which center light directed to a measurement point set in the scale model is generated in a process of the scanning;

an irradiated point detection step of detecting a position of an irradiated point appearing under the center light generation state on a light receiving sphere installed so as to have a center coincide with the measurement point; and an estimation step of estimating a direction connecting a position of the center and the position of the irradiated point as an arrival direction of the light reaching the measurement point.

Further, the second aspect is a propagation environment estimation system that estimates a propagation environment of a radio wave using a scale model, and desirably includes:

a 3D printer that creates a scale model;

an element mounter that installs a light source in the scale model, regarding the light source as a transmission station of a radio wave, the light source being capable of emitting light having directivity and scanning an irradiation direction; and a control device that controls the 3D printer and the element mounter, the control device being configured to further execute processing of scanning an inside of the scale model with the light source, processing of detecting a center light generation state in which center light directed to a measurement point set in the scale model is generated in a process of the scanning, processing of detecting a position of an irradiated point appearing under the center light generation state on a light receiving sphere installed so as to have a center coincide with the measurement point, and processing of estimating a direction connecting a position of the center and the position of the irradiated point as an arrival direction of the light reaching the measurement point.

Further, the third aspect is a propagation environment estimation device that estimates a propagation environment of a radio wave using a scale model, and desirably includes:

a 3D printer unit that creates a scale model;

an element mounter unit that installs a light source in the scale model, regarding the light source as a transmission station of a radio wave, the light source being capable of emitting light having directivity and scanning an irradiation direction; and a control device unit that controls the 3D printer unit and the element mounter unit, the control device unit being configured to further execute processing of scanning an inside of the scale model with the light source, processing of detecting a center light generation state in which center light directed to a measurement point set in the scale model is generated in a process of the scanning, processing of detecting a position of an irradiated point appearing under the center light generation state on a light receiving sphere installed so as to have a center coincide with the measurement point, and processing of estimating a direction connecting a position of the center and the position of the irradiated point as an arrival direction of the light reaching the measurement point.

Advantageous Effects of Invention

According to the first to third aspects, it is possible to estimate an arrival direction of a radio wave at an arbitrary measurement point simply and at low cost when estimating a propagation characteristic of a radio wave using a scale model.

DESCRIPTION OF EMBODIMENTS

First Embodiment

Outline of First Embodiment

Figure 1:
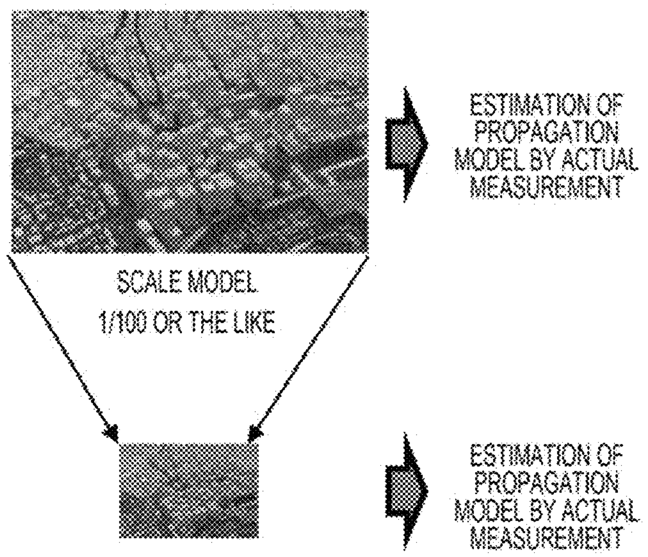
FIG. 1 is a schematic diagram illustrating a state in which a propagation model is estimated by actual measurement in a real area and a state in which model estimation by actual measurement is performed using a scale model in comparison.
Figure 2:
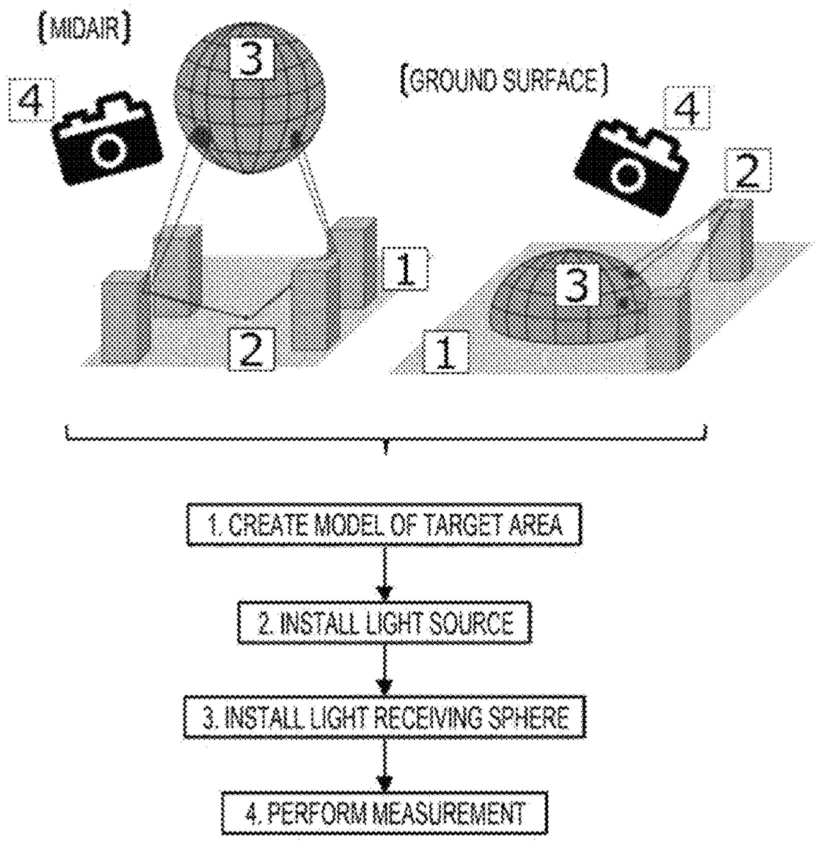
FIG. 2 is a diagram for describing an outline of a propagation environment estimation method according to a first embodiment of the present disclosure.

FIG. 2 is a diagram for describing an outline of a propagation environment estimation method according to a first embodiment of the present disclosure. More specifically, an upper part of FIG. 2 illustrates a perspective view of a scale model used in the propagation environment estimation method of the present embodiment. More specifically, the left side in the upper part of FIG. 2 illustrates a case where a midair point in the scale model is set as a radio wave measurement point. Furthermore, the right side in the upper part of FIG. 2 illustrates a case where a point on a ground surface in the scale model is set as a radio wave measurement point.

A lower part of FIG. 2 illustrates a flowchart for describing an outline of the propagation environment estimation method of the present embodiment. The numbers “1”, “2”, “3”, and “4” illustrated in the upper part of FIG. 2 respectively correspond to numbers of steps illustrated in the lower part of FIG. 2.

The propagation environment estimation method according to the present embodiment is suitable as a method for investigating a propagation characteristic of a wireless signal in a service area in advance in a case where a wireless communication service is newly started. Typically, the service area is assumed to be an urban area where many buildings exist.

As illustrated in FIG. 2, in the propagation environment estimation method of the present embodiment, estimation of a propagation environment is advanced by the following procedure.

1. A model of the target area is created. Hereinafter, this model is referred to as a “scale model”. The scale model reproduces a real urban space or the like at a scale of about 1/100, for example. FIG. 2 illustrates an example in which an outdoor space is set as the target area, but an indoor space of a specific building may be set as the target area.
2. A light source is installed as a transmission source of radio waves. As the light source, a laser pointer or the like that emits laser light having excellent straightness is used. The light source is configured to be able to scan an irradiation direction of the laser light in three dimensions.
3. A light receiving sphere is installed such that a measurement point set in the scale model is centered. The light receiving sphere is made of a material that appropriately reflects laser light so that an irradiated point can be visually identified or by an image sensor when the laser light is emitted. For example, a fluorescent coating material or the like may be applied to the light receiving sphere so that the irradiated point of the laser light becomes clear. In the case where the measurement point exists in midair, a perfect sphere is used as the light receiving sphere. Meanwhile, when the measurement point exists on a ground surface, a hemisphere is used as the light receiving sphere.
4. Next, from which direction the light reaching the measurement point, that is, the center of the light receiving sphere comes is measured. Hereinafter, such light is referred to as “center light”. Since the laser light emitted from the light source is reflected by various elements included in the scale model, the laser light may arrive at the measurement point from all directions.

Here, first, a scanning position of the laser light that generates the center light is searched for by a method to be described below. Then, when a state in which the center light is generated is found as a result of the search, which position of the light receiving sphere is irradiated is detected under the state. Since the center light is light passing through the center of the light receiving sphere, when the irradiated point on the surface of the light receiving sphere is known, the direction connecting the point and the center is an arrival direction of the center light. In the present embodiment, the arrival direction of the light reaching the measurement point is estimated according to such a principle.

Points to be Noted in First Embodiment (1) In creating the scale model of the target area, it is necessary to appropriately determine what scale is adopted. In the present embodiment, representatively, the following points are noted in determining the scale.

(1-a) Installation Space for Element or the Like

As described above, in the present embodiment, a light source regarded as a transmission source of radio waves needs to be installed in the scale model. In addition, a light receiving sphere needs to be installed at the measurement point. These elements are installed on a road or in a square in the target area. Then, the installation space changes according to the scale of the scale model, and if an excessive scale is adopted, a situation where the light source and the light receiving sphere cannot be installed at the corresponding places of the scale model. Therefore, in the present embodiment, the scale of the scale model is determined so that various elements and the like required for estimating the propagation characteristic do not interfere with a building or the like.

(1-b) Reaching Distance of Measurement Light

Figure 3:
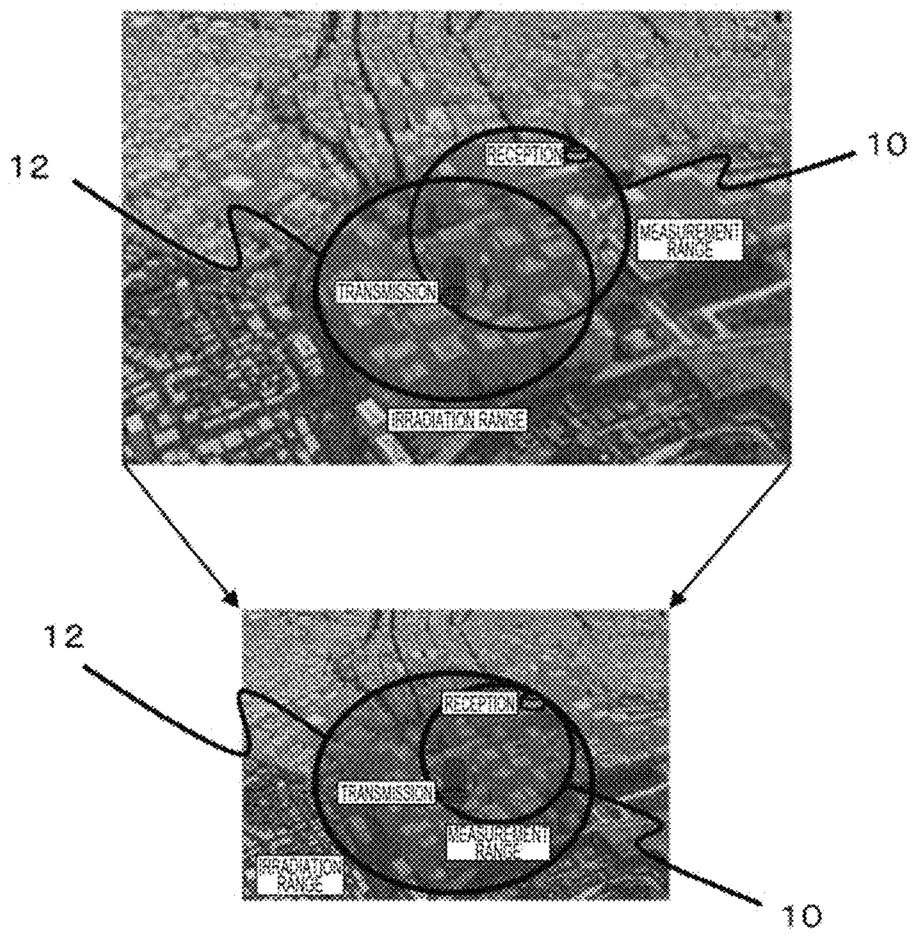
FIG. 3 is a diagram for describing one of points to be noted in determining a scale of a scale model in the propagation environment estimation method according to the first embodiment of the present disclosure.

FIG. 3 illustrates two types of scale models with different scales in comparison. More specifically, the upper part of FIG. 3 illustrates a scale model with a large scale, and the lower part of FIG. 3 illustrates a scale model with a small scale. In each scale model, an area where the propagation characteristic is desired to be measured is indicated as a “measurement range” 10. Further, an arrival circle of light emitted from the light source regarded as a transmission source of radio waves is illustrated as an “irradiation range” 12.

In the scale model in the upper part of FIG. 3, a region beyond the irradiation range 12 of the light source is generated in a part of the measurement range 10 due to the too large scale. In this case, the light from the light source cannot reach a part of the measurement range 10. On the other hand, in the scale model in the lower part of FIG. 3, the entire measurement range 10 is covered with the irradiation range 12. In this case, since the light from the light source reaches the entire measurement range 10, the measurement point can be set in the entire measurement range 10. In view of such circumstances, in the present embodiment, the scale of the scale model is determined such that the entire measurement range 10 falls within the irradiation range 12 without excess or deficiency, as illustrated in the lower part of FIG. 3.

(2) It is desirable that behavior of the light regarded as the radio waves is consistent with behavior of the radio waves in a real area. In the propagation characteristic estimation method of the present embodiment, attention is paid to reflectance of radio waves and light in order to meet the above requirements.

Reflectance of the radio waves in each part of the target area is reflected in the behavior of the radio waves. Similarly, the behavior of the light emitted from the light source is affected by the reflectance of the light in each part of the scale model. In the present embodiment, surface treatment is applied to each part of the scale model so that the reflectance of the radio waves in each part of the target area is consistent with the reflectance of the light in each part of the scale model. The surface treatment is performed by, for example, applying a coating material, texturing a model wall surface, or the like.

[Search for Scanning Position for Generating Center Light]

Figure 4:
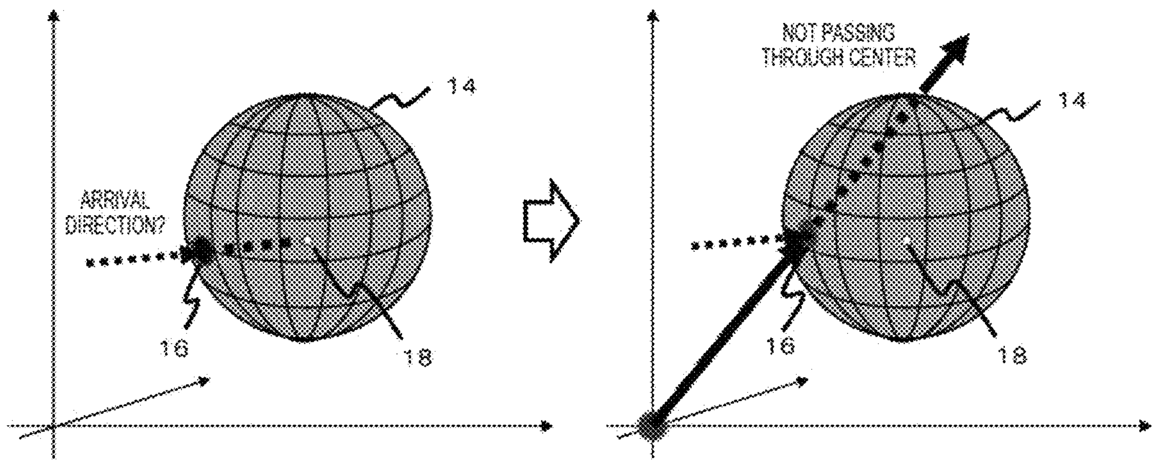
FIG. 4 is a diagram for describing a state in which light that does not pass through a center of a sphere is emitted to a light receiving sphere used in the first embodiment of the present disclosure.

The left side of FIG. 4 illustrates a state in which an irradiated point 16 of the laser light appears on a surface of a light receiving sphere 14. When the laser light that generates the irradiated point 16 is the center light passing through a center 18 of the light receiving sphere 14 as indicated by the broken line in the drawing, the arrival direction of the laser light is a direction connecting the irradiated point 16 and the center 18.

The right side of FIG. 4 illustrates a state in which the irradiated point 16 similar to that illustrated on the left side of FIG. 4 appears on the surface of the light receiving sphere 14 as a result of illuminating the surface of the light receiving sphere 14 with the non-center light that does not pass through the center 18. Since it is difficult to capture a trajectory of light in space, only the irradiated point 16 can be easily detected by visual observation or an image sensor. Then, in the case where the irradiated point 16 is detected, generation of the center light cannot be recognized on the basis of the fact only, as described above. Therefore, even if only the generation of the irradiated point 16 is detected, the arrival direction of the light illuminating the light receiving sphere 14 cannot be estimated.

Figure 5:
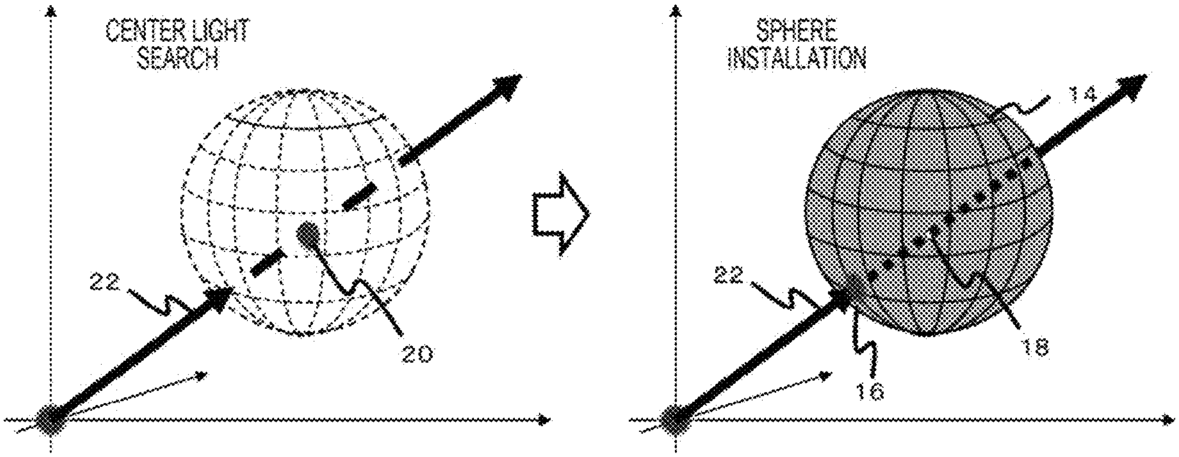
FIG. 5 is a diagram for describing a state in which light that passes through a center of a sphere is emitted to the light receiving sphere used in the first embodiment of the present disclosure.

FIG. 5 is a diagram for describing a principle of detecting generation of the center light and estimating the arrival direction of the center light in the present embodiment. The left side of FIG. 5 illustrates a state in which a light receiving target 20 is irradiated with laser light 22. The light receiving target 20 is installed at a point where the arrival direction of radio waves wants to know, that is, at a measurement point. A sphere indicated by the broken line in the drawing is virtual and does not actually exist. When the light receiving target 20 is irradiated with the laser light 22, reflection occurs in the light receiving target 20, so that the occurrence of the state can be easily detected by visual observation or imaging by an image sensor.

The right side of FIG. 5 illustrates a state in which the light receiving sphere 14 is disposed such that the center 18 coincides with the measurement point in a state in which the laser light 22 illuminating the light receiving target 20 is generated. In this case, the laser light 22 is the center light passing through the center 18 of the light receiving sphere 14. Further, the irradiated point 16 appears on the surface of the light receiving sphere 14 by being illuminated with the laser light 22. In this case, since it is guaranteed that the irradiated point 16 is illuminated with the center light, the direction connecting the irradiated point 16 and the center 18 can be estimated as the arrival direction of the laser light 22.

Details of Procedures in First Embodiment

Figure 6:
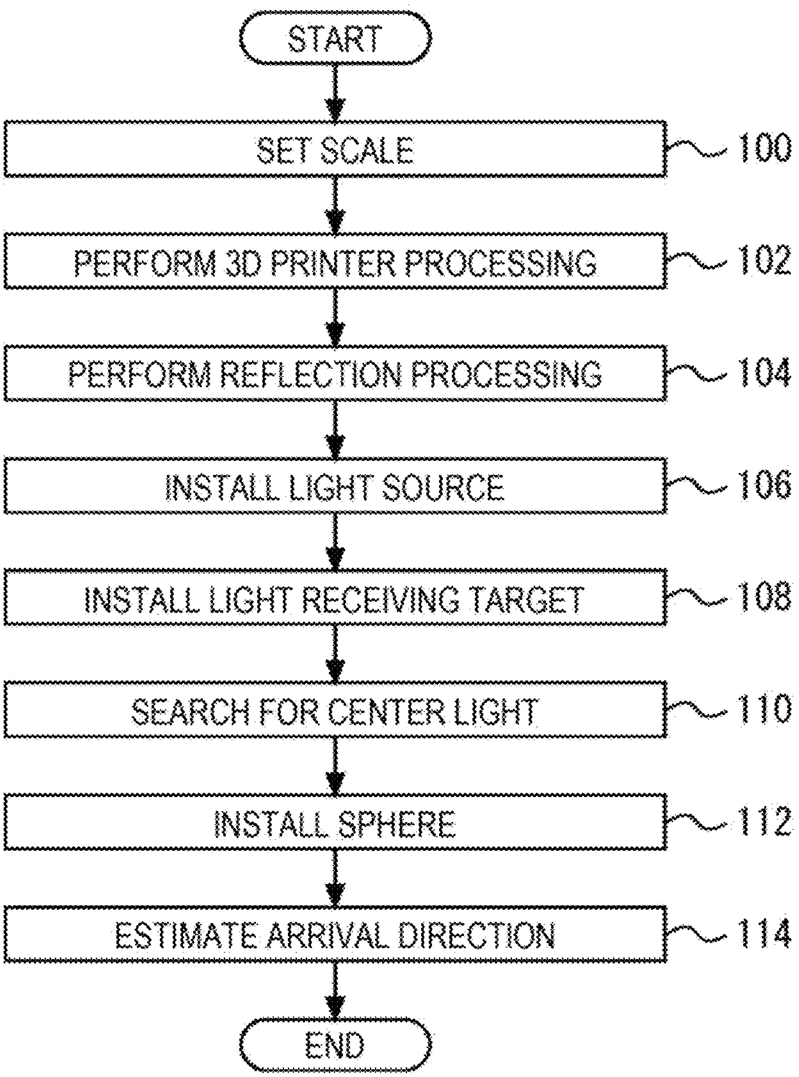
FIG. 6 is a flowchart for describing a flow of processing when estimating a propagation environment according to the propagation environment estimation method of the first embodiment of the present disclosure.

FIG. 6 is a flowchart for describing a procedure of the propagation environment estimation method of the present embodiment in detail. The procedure illustrated in FIG. 6 is started when collection of information such as dimensions and locations of buildings and roads, the reflectance of the radio waves at main points, and the frequency of the radio waves scheduled to be used is completed for the real target area, and specifications of the light source and the like used for measurement are determined.

As illustrated in FIG. 6, according to this procedure, first, the scale of the scale model to be created is determined (step 100). In present step 100, with attention being paid to the above points (1-*a*) and (1-*b*), the scale without excess or deficiency is determined under essential conditions that the elements such as the light source can be installed and that the irradiation range 12 by the light source covers the entire measurement range 10.

Next, the scale model is created by a 3D printer (step 102). Here, first, information regarding dimensions and arrangement of various buildings and the like existing in the target area is provided to the 3D printer together with the above-described scale. The 3D printer creates the scale model of the target area according to the provided scale.

When the processing of the 3D printer is completed, next, reflection processing is applied to the created scale model (step 104). For example, coating treatment, surface treatment, or the like for adjusting the reflectance of light with the reflectance of the radio waves is applied to the model wall surface of the building. The reflection processing in present step may be manually performed by an operator. Alternatively, the coating treatment may be performed by a fully automatic coating device capable of three-dimensionally specifying a coating place. Further, the surface treatment may be implemented by processing using a 3D printer.

Next, the light source resembling a transmission station of radio waves, specifically, a laser pointer capable of three-dimensional scanning is installed (step 106). The light source is installed at an installation proposed location of the transmission station in the scale model. The light source may be manually installed by an operator or may be installed by a fully automatic element mounter without manual operation.

Next, the light receiving target 20 is arranged at the measurement point set in the scale model (step 108). The light receiving target 20 desirably has a spherical shape or a shape approximate to a spherical shape so that light from all directions can be reflected under substantially uniform conditions. In addition, the size of the light receiving target 20 is desirably set to be smaller than the size obtained by converting in scale the area in which the arrival direction of the radio wave is desired to be grasped in the actual target area.

When the above processing is completed, the scanning position of the laser pointer that generates the center light is searched for (step 110). As the scanning direction of the laser pointer changes, various types of reflected light are generated in addition to direct light in the scale model. These types of light may become the laser light 22 that illuminates the light receiving target 20 at a certain scanning position. In present step 110, a state in which the light receiving target 20 is illuminated with the laser beam is searched for by visual observation or image processing while changing the scanning direction of the laser pointer manually or automatically. When the generation of the state is recognized, it is determined that the laser light 22 satisfying conditions of the center light is generated.

When the generation of the laser light 22 satisfying conditions of the center light is recognized, the light receiving sphere 14 is installed in the scale model while maintaining the state (step 112). The light receiving sphere 14 is installed such that its center 18 coincides with the installation position of the light receiving target 20. As a result, a state in which the light receiving sphere 14 is illuminated with the center light passing through the center 18 is formed.

Next, the arrival direction of the center light is estimated (step 114). Here, first, the position of the irradiated point 16 appearing on the light receiving sphere 14 is measured. The position of the irradiated point 16 can be measured as three-dimensional information by applying known image processing to an image obtained using a capturing device that captures the irradiated point 16 in an angle of view.

Next, the arrival direction of the center light, that is, the arrival direction of the light at the measurement point is calculated on the basis of a three-dimensional position of the irradiated point 16 and a known three-dimensional position of the center 18.

As described above, according to the propagation environment estimation method of the present embodiment, it is possible to estimate the arrival direction of light at the measurement point without installing a plurality of antennas or a large directional antenna in the scale model. The arrival direction of light estimated in this manner accurately coincides with the arrival direction of the radio wave in the real target area. Therefore, according to the method of the present embodiment, it is possible to estimate the arrival direction of the radio wave at an arbitrary measurement point in the target area easily and at low cost.

Propagation Environment Estimation System of First Embodiment

Figure 7:
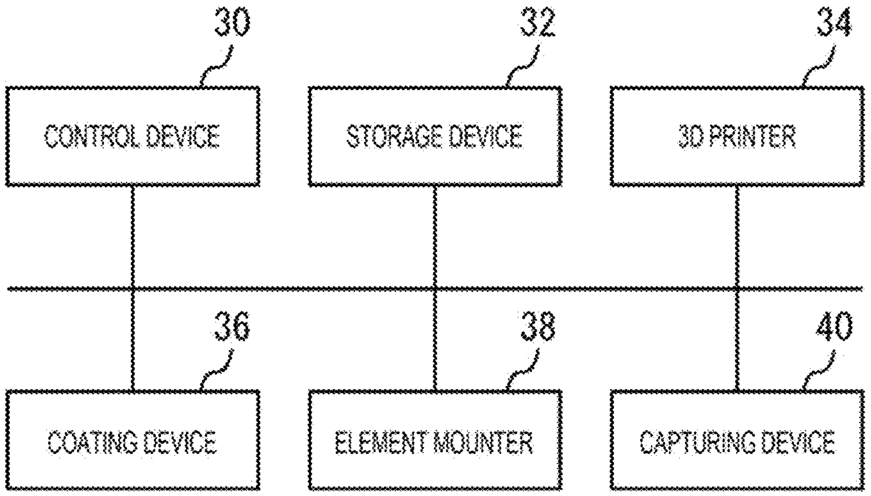
FIG. 7 is a block diagram for describing a configuration of a propagation environment estimation system that continuously performs a series of processing illustrated in FIG. 6 in a fully automatic manner.

FIG. 7 is a block diagram for describing a configuration of a propagation environment estimation system capable of continuously performing the series of processing illustrated in FIG. 6 in a fully automatic manner. The system illustrated in FIG. 7 includes a control device 30 and a storage device 32. The control device 30 includes an arithmetic processing unit. The storage device 32 stores a program to be executed by the arithmetic processing unit. The control device 30 controls each unit of the system illustrated in FIG. 7 by the arithmetic processing unit proceeding with processing according to the above-described program.

The storage device 32 stores various types of information regarding the target area in addition to the above-described program. This information includes the dimensions and locations of buildings, roads, and the like, the reflectance of the radio waves, and the like. The storage device 32 also stores dimensional data of various elements that can be used in the scale model. Furthermore, the storage device 32 also stores the result of measurement performed using the scale model, that is, information in the arrival direction obtained in the processing of step 114.

The system illustrated in FIG. 7 includes a 3D printer 34. The control device 30 reads the various types of information from the storage device 32 and performs the processing of step 100 described above, that is, the scale determination processing. The 3D printer reads the information regarding the target area from the storage device 32, and cuts out the scale model at the scale determined by the control device 30. In a case where texture processing needs to be applied to a specific portion in order to make the reflectance of the radio waves and the reflectance of the measurement light uniform, the processing is also performed by the 3D printer 34.

The system illustrated in FIG. 7 includes a coating device 36. The coating device 36 includes a coating material nozzle that can three-dimensionally move, and can apply a desired coating material to an arbitrary position of the scale model. In response to a command from the control device 30, the coating device 36 can apply coating for obtaining the desired reflectance to a specified position of the scale model on the basis of the information read from the storage device 32.

The system illustrated in FIG. 7 includes an element mounter 38. The element mounter 38 has a function to install various elements and the like scheduled to be used in the scale model at an arbitrary position of the scale model. In the present embodiment, the laser pointer functioning as the light source and the light receiving sphere 14 installed at the measurement point are installed by the element mounter 38 according to the command of the control device 30.

The system illustrated in FIG. 7 further includes a capturing device 40. The capturing device 40 has a function to capture the measurement point set in the scale model from a plurality of directions. More specifically, the capturing device 40 is configured to be able to capture the light receiving target 20 and the light receiving sphere 14 from all directions. The search processing in step 110 and the estimation processing in step 114 are both executed on the basis of data of an image captured by the capturing device 40.

According to the propagation environment estimation system illustrated in FIG. 7, the series of procedures illustrated in FIG. 6 can be carried out all at once and automatically. Therefore, according to this system, it is possible to significantly improve efficiency of the operation of estimating the arrival direction of the radio wave in the target area using the scale model.

Modification of First Embodiment

Meanwhile, in the above-described first embodiment, the generation of the center light is detected by visually observing or with an image sensor that the light receiving target 20 reflects the laser light. However, the present disclosure is not limited thereto. A light receiving element that reacts to light irradiation may be arranged as the light receiving target 20, and the generation of the center light may be detected on the basis of whether the light receiving element has detected light irradiation.

Further, in the first embodiment, when the light receiving sphere 14 is irradiated with the center light, the position of the irradiated point 16 is detected by an image sensor. However, the present disclosure is not limited thereto. For example, a plurality of light receiving elements may be arranged on the surface of the light receiving sphere 14 so that the irradiation light can be detected in all directions, and the position of the light receiving element irradiated with the center light may be recognized as the position of the irradiated point 16.

Further, in the above-described first embodiment, the configuration illustrated in FIG. 7 has been described as a system including a plurality of devices, but the present disclosure is not limited thereto. That is, the configuration illustrated in FIG. 7 may be a single device in which the illustrated elements are housed in a single housing.

Note that the same similarly applies to the second or third embodiment to be described below in that the above modifications can be made.

Second Embodiment

Features of Second Embodiment

Next, a second embodiment of the present disclosure will be described with reference to FIG. 8 together with FIGS. 2 to 5 and FIG. 7. In the above-described first embodiment, the processing of detecting the generation of the center light using the light receiving target 20 and the processing of installing the light receiving sphere 14 in the state where the center light is being generated have been advanced in time series. A propagation environment estimation method according to the present embodiment is characterized in that two scale models are used to perform these pieces of processing simultaneously in parallel.

Details of Procedures in Second Embodiment

Figure 8:
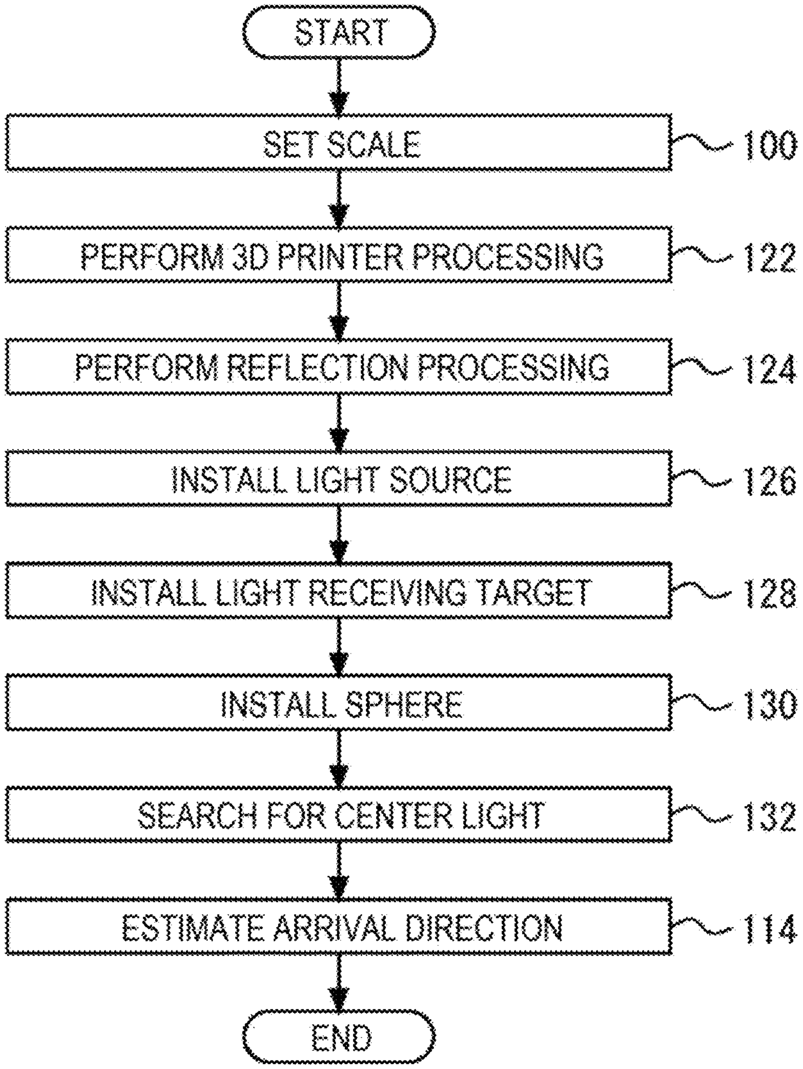
FIG. 8 is a flowchart for describing a flow of processing when estimating a propagation environment according to a propagation environment estimation method of a second embodiment of the present disclosure.

FIG. 8 is a flowchart for describing a procedure of the propagation environment estimation method of the present embodiment in detail. Similarly to the procedure illustrated in FIG. 6, the procedure illustrated in FIG. 8 is started when information collection for the actual target area is completed and specifications of a light source and the like used for measurement are determined. Note that, in the following description, steps similar to the steps illustrated in FIG. 6 among the steps illustrated in FIG. 8 are denoted with the common reference numerals, and description thereof is omitted or simplified.

According to the flowchart illustrated in FIG. 8, processing by a 3D printer is performed following processing of step 100 (step 122). Here, two scale models in which a target area is reproduced at a desired scale are duplicately created.

Next, processing for matching reflectance of a radio wave and reflectance of light are similarly performed for the two scale models (step 124). Next, a light source resembling a transmission station of radio waves, specifically, a laser pointer is arranged in the two scale models (step 126).

Subsequently, a light receiving target 20 is arranged at a measurement point of one scale model (step 128). Further, in the other scale model, a light receiving sphere 14 is installed such that a center 18 coincides with the measurement point (step 130).

When the above processing is completed, a search for center light using the two scale models is performed (step 132). Here, first, in both of the two scale models, scanning by the laser pointer is similarly performed. As a result, in the two scale models, various kinds of reflected light are similarly generated. In a case where the light receiving target 20 arranged in one scale model is illuminated with laser light 22, the light receiving sphere 14 should be illuminated with the center light in the other scale model. Therefore, when this state can be detected, it is determined that a scanning position where the center light is generated can be searched for.

Thereafter, as in the case of the first embodiment, an arrival direction of light is estimated by the processing of step 114. That is, a direction connecting the position of the irradiated point 16 generated in the light receiving sphere 14 arranged in the other scale model and the center 18 of the light receiving sphere 14 is estimated as the arrival direction of light.

As described above, according to the propagation environment estimation method of the present embodiment, it is possible to estimate from which direction the light arrives at the measurement point of the scale model without using a plurality of antennas or a large directional antenna, similarly to the case of the first embodiment. Therefore, according to the method of the present embodiment, it is possible to estimate the arrival direction of the radio wave at an arbitrary measurement point in the target area easily and at low cost, similarly to the case of the first embodiment.

Note that the series of procedures performed in the present embodiment can be carried out all at once and automatically by a propagation environment estimation system or a propagation environment estimation device having the configuration illustrated in FIG. 7, similarly to the first embodiment.

Third Embodiment

Features of Third Embodiment

Next, a third embodiment of the present disclosure will be described with reference to FIGS. 9 and 10 together with FIGS. 2 to 5 and FIG. 7. To estimate the arrival direction of light using the light receiving sphere 14, it is necessary to irradiate the light receiving sphere 14 with center light and then measure the position of the irradiated point 16 appearing on the surface of the light receiving sphere. Then, the above-described first and second embodiments meet the above-described requirement by searching for the state in which the generation of the center light is recognized and irradiating the light receiving sphere 14 with the center light.

By the way, the irradiated point 16 appearing on the surface of the light receiving sphere 14 has a feature depending what an angle the irradiation light reaches the light receiving sphere 14. The left side of FIG. 9 illustrates a state of the irradiated point 16 that occurs in a case where the irradiation light is perpendicularly emitted to the light receiving sphere 14, that is, in a case where the light receiving sphere 14 is irradiated with the center light. Furthermore, the right side of FIG. 9 illustrates a state of the irradiated point 16 that occurs in a case where the irradiation light is obliquely emitted to the light receiving sphere 14, that is, in a case where the light receiving sphere 14 is irradiated with the non-center light.

Figure 9:
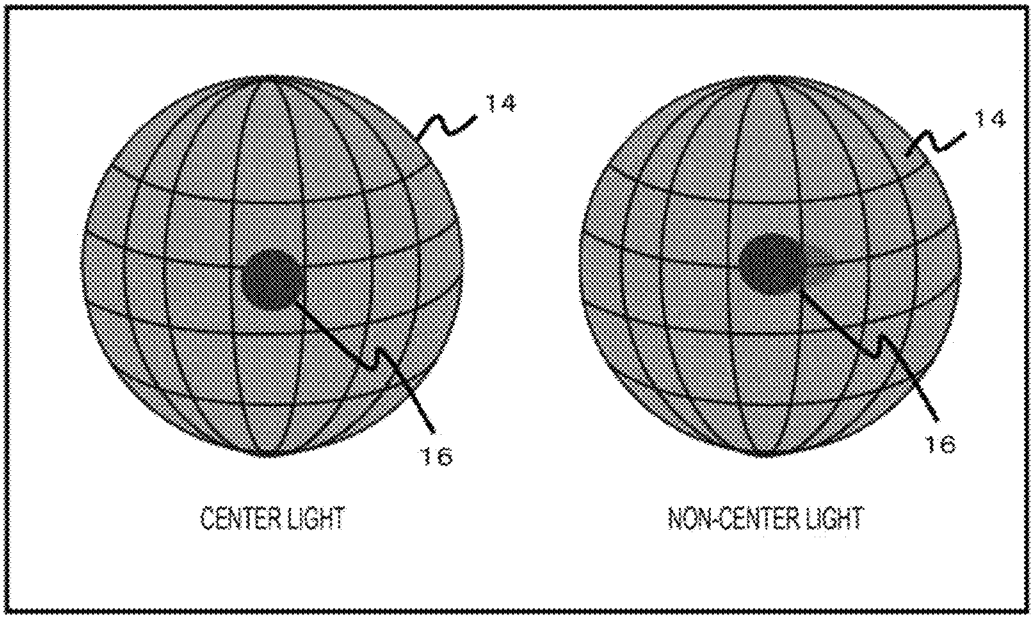
FIG. 9 is a diagram for describing learning items for determining whether irradiation light is center light passing through a center of a sphere in a third embodiment of the present disclosure.

In the case where the light receiving sphere 14 is irradiated with the center light, the irradiated point 16 has a clear circular shape as illustrated on the left side of FIG. 9. On the other hand, in the case where the light receiving sphere is irradiated with the non-center light, the irradiated point 16 does not have a clear circular shape, and is accompanied by smearing, as illustrated on the right side of FIG. 9. For this reason, if characteristics of the irradiated point 16 caused by the center light, for example, the size of the circular shape that can be regarded as the irradiated point 16, a luminance difference between the circular shape and a peripheral region, presence of smearing existing around the circular shape, and the like are learned, it is possible to determine whether the irradiated point 16 is caused by the center light on the basis of the shape and the like of the irradiated point 16 that has appeared.

Therefore, in the present embodiment, a relationship between an angle of laser light 22 reaching a light receiving sphere 14 and a feature of an irradiated point 16 appearing on the light receiving sphere 14 is learned in advance, and in a process of scanning with a laser pointer, generation of center light is determined on the basis of a shape or the like of the irradiated point 16 in light of a learning result. Note that the learning of the feature of the irradiated point 16 may be simple sample acquisition or using machine learning.

Details of Procedures in Third Embodiment

Figure 10:
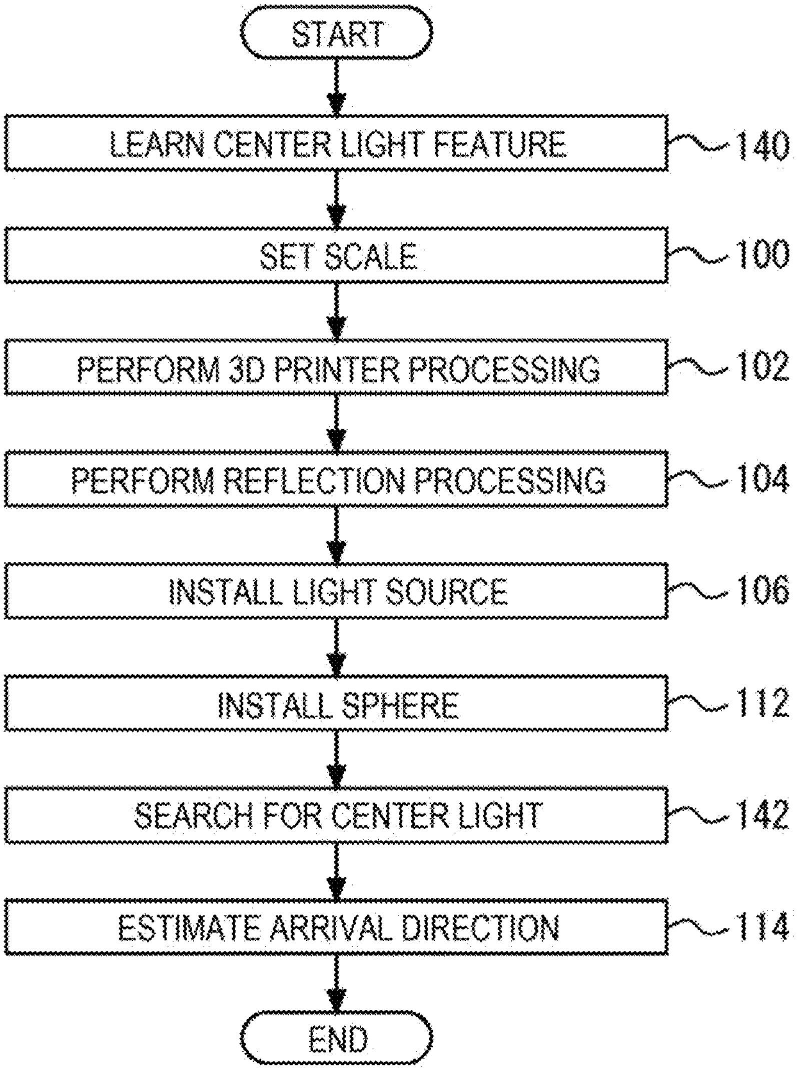
FIG. 10 is a flowchart for describing a flow of processing when estimating a propagation environment according to a propagation environment estimation method of the third embodiment of the present disclosure.

FIG. 10 is a flowchart for describing a procedure of a propagation environment estimation method of the present embodiment in detail. Similarly to the procedure illustrated in FIG. 6, the procedure illustrated in FIG. 10 is started when information collection for an actual target area is completed and specifications of a light source and the like used for measurement are determined. Note that, in the following description, steps similar to the steps illustrated in FIG. 6 among the steps illustrated in FIG. 10 are denoted with the common reference numerals, and description thereof is omitted or simplified.

According to the flowchart illustrated in FIG. 10, first, the feature of the irradiated point 16 caused by the center light is learned (step 140). This learning may be performed by generating the center light by a method similar to the method in the first embodiment and done for the feature of the irradiated point 16 generated due to the center light. Alternatively, a laser pointer may be arranged such that irradiation light is directed to a center 18 of the light receiving sphere 14, and the feature of the irradiated point 16 generated as a result may be learned.

When the learning of the irradiated point 16 caused by the center light is completed, processing of steps 100 to 106 and step 112 is performed as in the case of the first embodiment. As a result, a scale model is created, and the light source and the light receiving sphere 14 are installed therein.

Next, by the method of the present embodiment, a scanning position of the laser pointer that generates the center light is searched for (step 142). Specifically, the laser pointer is scanned while the light receiving sphere 14 is monitored in all directions by an image sensor. In a process of scanning, it is sequentially determined whether the irradiated point 16 appears on the light receiving sphere 14. Furthermore, in a case where the appearance of the irradiated point 16 is recognized, it is determined whether or not the feature of the appearing irradiated point 16 matches the feature caused by the center light. Then, when the determination of coincidence is obtained, the generation of the center light is recognized.

When the generation of the center light is recognized, thereafter, the arrival direction of light is estimated by the processing of step 114, similarly to the case of the first embodiment.

As described above, according to the propagation environment estimation method of the present embodiment, it is possible to estimate from which direction the light arrives at the measurement point of the scale model without using a plurality of antennas or a large directional antenna, similarly to the case of the first embodiment. Therefore, according to the method of the present embodiment, it is possible to estimate the arrival direction of the radio wave at an arbitrary measurement point in the target area easily and at low cost, similarly to the case of the first embodiment.

Note that the series of procedures performed in the present embodiment can be carried out all at once and automatically by a propagation environment estimation system or a propagation environment estimation device having the configuration illustrated in FIG. 7, similarly to the first embodiment.

REFERENCE SIGNS LIST

10 Measurement range
12 Irradiation range
14 Light receiving sphere
16 Irradiated point
18 Center
20 Light receiving target
22 Laser light
30 Control device
32 Storage device
34 3D printer
36 Coating device
38 Element mounter
40 Capturing device

The invention claimed is:

1. A propagation environment estimation method for estimating a propagation environment of a radio wave using a scale model, the propagation environment estimation method comprising:
- creating a scale model;
- installing a light source in the scale model, regarding the light source as a transmission station of a radio wave, the light source being capable of emitting light having directivity and scanning an irradiation direction;
- scanning an inside of the scale model with the light source;
- detecting a center light generation state in which center light directed to a measurement point set in the scale model is generated in said scanning;
- detecting a position of an irradiated point appearing on a light receiving sphere under the center light generation state, the light receiving sphere being installed so as to have a center coincide with the measurement point; and
- estimating a direction connecting a position of the center and the position of the irradiated point as an arrival direction of the light reaching the measurement point.

2. The propagation environment estimation method according to claim 1, wherein
- the detection of said center light generation state includes:
  - installing a light receiving target at the measurement point, and
  - detecting a state in which the light receiving target is illuminated with the light as the center light generation state, and
- the detection of said position of the irradiated point includes
  - installing the light receiving sphere in the scale model such that the measurement point and the center coincide with each other after the detection of the center light generation state, and
  - detecting the position of the irradiated point appearing under the center light generation state on the installed light receiving sphere.

3. The propagation environment estimation method according to claim 1, wherein
- the creation of said scale model includes creating two identical scale models,
- the installation of said light source includes installing the light source in each of the two scale models,
- the scanning includes similarly scanning the two scale models with the respective light sources,
- the detection of said center light generation state includes
  - installing a light receiving target at the measurement point of one of the scale models, and
  - detecting a state in which the light receiving target is illuminated with the light as the center light generation state, and
- the detection of said position of the irradiated point includes
  - installing the light receiving sphere such that a center coincides with the measurement point of the other scale model, and
  - detecting a position of an irradiated point appearing on the light receiving sphere installed in the other scale model in a state where the center light generation state is detected in the one scale model.

4. The propagation environment estimation method according to claim 1, further comprising: setting a scale of the scale model prior to the creation of the scale model,
- the setting of said scale including
  - acquiring information regarding an installation space of the transmission station in a target area,
  - acquiring dimensions of the light source, and
  - setting the scale such that the light source is accommodated in a corresponding portion of the installation space in the scale model.

5. The propagation environment estimation method according to claim 1, further comprising: applying reflection treatment to at least a part of the scale model such that a light reflectance in the scale model matches a radio wave reflectance in a target area.

6. The propagation environment estimation method according to claim 1, further comprising: setting a wavelength of light emitted from the light source on a basis of a frequency of the radio wave assumed to be used in a target area such that a behavior of light in the scale model matches a behavior of the radio wave in the target area.

7. A propagation environment estimation system that estimates a propagation environment of a radio wave using a scale model, the propagation environment estimation system comprising:

a 3D printer that creates a scale model;

an element mounter that installs a light source in the scale model, regarding the light source as a transmission station of a radio wave, the light source being capable of emitting light having directivity and scanning an irradiation direction; and a controller that controls the 3D printer and the element mounter, the controller being configured to further execute scanning an inside of the scale model with the light source, detecting a center light generation state in which center light directed to a measurement point set in the scale model is generated in said scanning, detecting a position of an irradiated point appearing on a light receiving sphere under the center light generation state, the light receiving sphere being installed so as to have a center coincide with the measurement point, and estimating a direction connecting a position of the center and the position of the irradiated point as an arrival direction of the light reaching the measurement point.

8. A propagation environment estimation device that estimates a propagation environment of a radio wave using a scale model, the propagation environment estimation device comprising:

a 3D printer that creates a scale model;

an element mounter that installs a light source in the scale model, regarding the light source as a transmission station of a radio wave, the light source being capable of emitting light having directivity and scanning an irradiation direction; and a controller that controls the 3D printer and the element mounter, wherein the 3D printer, the element mounter, and the controller are all housed in a single housing, and the controller is configured to further execute scanning an inside of the scale model with the light source, detecting a center light generation state in which center light directed to a measurement point set in the scale model is generated in a process of the scanning, detecting a position of an irradiated point appearing on a light receiving sphere under the center light generation state, the light receiving sphere being installed so as to have a center coincide with the measurement point, and estimating a direction connecting a position of the center and the position of the irradiated point as an arrival direction of the light reaching the measurement point.

9. The propagation environment estimation method according to claim 2, further comprising: setting a scale of the scale model prior to the creation of the scale model, the setting of said scale including acquiring information regarding an installation space of the transmission station in a target area, acquiring dimensions of the light source, and setting the scale such that the light source is accommodated in a corresponding portion of the installation space in the scale model.

10. The propagation environment estimation method according to claim 3, further comprising: setting a scale of the scale model prior to the creation of the scale model, the setting of said scale including acquiring information regarding an installation space of the transmission station in a target area, acquiring dimensions of the light source, and setting the scale such that the light source is accommodated in a corresponding portion of the installation space in the scale model.

11. The propagation environment estimation method according to claim 2, further comprising: applying reflection treatment to at least a part of the scale model such that a light reflectance in the scale model matches a radio wave reflectance in a target area.

12. The propagation environment estimation method according to claim 3, further comprising: applying reflection treatment to at least a part of the scale model such that a light reflectance in the scale model matches a radio wave reflectance in a target area.

13. The propagation environment estimation method according to claim 4, further comprising: applying reflection treatment to at least a part of the scale model such that a light reflectance in the scale model matches a radio wave reflectance in a target area.

14. The propagation environment estimation method according to claim 9, further comprising: applying reflection treatment to at least a part of the scale model such that a light reflectance in the scale model matches a radio wave reflectance in a target area.

15. The propagation environment estimation method according to claim 10, further comprising: applying reflection treatment to at least a part of the scale model such that a light reflectance in the scale model matches a radio wave reflectance in a target area.

16. The propagation environment estimation method according to claim 2, further comprising: setting a wavelength of light emitted from the light source on a basis of a frequency of the radio wave assumed to be used in a target area such that a behavior of light in the scale model matches a behavior of the radio wave in the target area.

17. The propagation environment estimation method according to claim 3, further comprising: setting a wavelength of light emitted from the light source on a basis of a frequency of the radio wave assumed to be used in a target area such that a behavior of light in the scale model matches a behavior of the radio wave in the target area.

18. The propagation environment estimation method according to claim 4, further comprising: setting a wavelength of light emitted from the light source on a basis of a frequency of the radio wave assumed to be used in a target area such that a behavior of light in the scale model matches a behavior of the radio wave in the target area.

19. The propagation environment estimation method according to claim 5, further comprising: setting a wavelength of light emitted from the light source on a basis of a frequency of the radio wave assumed to be used in a target area such that a behavior of light in the scale model matches a behavior of the radio wave in the target area.

20. The propagation environment estimation method according to claim 14, further comprising: setting a wavelength of light emitted from the light source on a basis of a frequency of the radio wave assumed to be used in a target area such that a behavior of light in the scale model matches a behavior of the radio wave in the target area.

* * * * *